(12) United States Patent
Holland et al.

(10) Patent No.: US 12,556,774 B2
(45) Date of Patent: Feb. 17, 2026

(54) ON-SCREEN SELECTABLE CHANNEL GUIDE

(71) Applicant: Sling TV L.L.C., Englewood, CO (US)

(72) Inventors: Kevin Holland, Denver, CO (US); Seth VanSickel, Parker, CO (US); Jonathan Lin, Denver, CO (US); Gilberto Malfabon, San Jose, CA (US)

(73) Assignee: Sling TV L.L.C., Englewood, CO (US)

( * ) Notice: Subject to any disclaimer, the term of this patent is extended or adjusted under 35 U.S.C. 154(b) by 65 days.

(21) Appl. No.: 18/421,822

(22) Filed: Jan. 24, 2024

(65) Prior Publication Data

US 2024/0414407 A1 Dec. 12, 2024

Related U.S. Application Data

(60) Provisional application No. 63/507,379, filed on Jun. 9, 2023.

(51) Int. Cl.
| | |
|---|---|
| *H04N 21/482* | (2011.01) |
| *G06F 3/0485* | (2022.01) |
| *H04N 21/431* | (2011.01) |

(52) U.S. Cl.
CPC ......... *H04N 21/482* (2013.01); *G06F 3/0485* (2013.01); *H04N 21/4316* (2013.01)

(58) Field of Classification Search
CPC ........... H04N 21/4312; H04N 21/4316; H04N 21/47; H04N 21/482; H04N 21/4821
See application file for complete search history.

(56) References Cited

U.S. PATENT DOCUMENTS

| | | | | |
|---|---|---|---|---|
| 6,763,522 | B1* | 7/2004 | Kondo | H04N 21/47 725/39 |
| 2004/0078814 | A1* | 4/2004 | Allen | H04N 21/4781 725/135 |
| 2006/0015903 | A1* | 1/2006 | MacBeth | H04N 7/163 725/39 |
| 2007/0009229 | A1* | 1/2007 | Liu | H04N 5/76 386/334 |
| 2007/0143493 | A1* | 6/2007 | Mullig | H04L 65/752 709/232 |
| 2010/0050208 | A1* | 2/2010 | Yu | H04N 21/4312 725/43 |
| 2011/0271302 | A1* | 11/2011 | Carlsgaard | H04N 21/42206 725/39 |

* cited by examiner

*Primary Examiner* — Rong Le
(74) *Attorney, Agent, or Firm* — Kilpatrick Townsend & Stockton LLP

(57) ABSTRACT

Systems and methods related to channel surfing are provided. In one example, a method includes receiving a user request to view presentation of a channel guide on a display, generating a channel guide including a channel list, at least one scroll indicator, and a focus indicator, and communicating the channel guide to the display. The display includes a main display area, a channel list display area overlaid on the main display area, and a focus area. The channel list is displayed in the channel list display area while the primary content of a current channel is being presented in the main display. The method further includes receiving a first user input activating the scroll indicator in a scroll direction, causing the channel identifiers to move in the channel list display area while the primary content continues to be presented in the main display area.

12 Claims, 8 Drawing Sheets

ON-SCREEN SELECTABLE CHANNEL GUIDE

CROSS REFERENCE TO RELATED APPLICATIONS

This application claims priority to U.S. Provisional Patent Application No. 63/507,379, filed on Jun. 9, 2023, the disclosure of which is incorporated by reference in its entirety for all purposes.

BACKGROUND

With the increasing availability of digital content and the proliferation of multimedia devices, there is a growing need for program guides and content discovery. As an example of a program guide, channel surfing refers to the practice of switching through channels on a television or media device to explore different broadcasting stations or digital programs. Traditional channel surfing is typically executed using a remote control or buttons on the television set. However, traditional channel surfing methods, relying on manual switching between channels, suffer from several significant limitations. For example, traditional channel surfing can be time-consuming and tedious, especially if there are numerous channels to scroll through. Users have to manually cycle through channels one by one, which can be frustrating and inefficient. In addition, traditional channel surfing may interrupt the current viewing experience every time the user switches to a new channel. Constantly switching channels can disrupt the flow of the content being watched, hinder the overall viewing experience, and undermine the efficiency of streaming ecosystem. Thus, there is a need for improving channel surfing.

SUMMARY

According to some embodiments, a method for channel surfing is provided. In one example, a method includes receiving a user request to view presentation of a channel guide on a display, generating a channel guide including a channel list, at least one scroll indicator, and a focus indicator, and communicating the channel guide to the display. The display includes a main display area, a channel list display area overlaid on the main display area, and a focus area. The channel list is displayed in the channel list display area while the primary content of a current channel is being presented in the main display. The method further includes receiving a first user input activating the scroll indicator in a scroll direction, and causing the channel identifiers to move in the channel list display area while the primary content continues to be presented in the main display area.

According to some embodiments, a system for channel surfing is provided. In one example, the system includes: at least one tuner, one or more processors and a computer-readable storage media storing computer-executable instructions. The computer-executable instructions, when executed by the one or more processors, cause the system to: receive a user request to view presentation of a channel guide on a display, generate a channel guide including a channel list, at least one scroll indicator, and a focus indicator, and communicate the channel guide to the display. The display includes a main display area, a channel list display area overlaid on the main display area, and a focus area. The channel list is displayed in the channel list display area while the primary content of a current channel is being presented in the main display. The instructions, when executed by the one or more processors, further cause the system to: receive a first user input activating the scroll indicator in a scroll direction and cause the channel identifiers to move in the channel list display area while the primary content continues to be presented in the main display area.

In accordance with some embodiments, the present disclosure also provides a non-transitory machine-readable storage medium encoded with instructions, the instructions executable to cause one or more electronic processors of a system to: receive a user request to view presentation of a channel guide on a display, generate a channel guide including a channel list, at least one scroll indicator, and a focus indicator, and communicate the channel guide to the display. The display includes a main display area, a channel list display area overlaid on the main display area, and a focus area. The channel list is displayed in the channel list display area while the primary content of a current channel is being presented in the main display. The instructions, when executed by the one or more processors, further cause the system to: receive a first user input activating the scroll indicator in a scroll direction and cause the channel identifiers to move in the channel list display area while the primary content continues to be presented in the main display area.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure provides systems and methods related to improved program guide and channel surfing techniques. One insight provided in the present disclosure is related to an improved program guide that allows on-screen channel surfing without interruption of the flow of the content being currently presented on the screen. According to some embodiments, the program guide may include a scrollable channel list that overlays on the main display area where the content of the current channel (i.e., the primary content) is being presented. The program guide further allows the user to scroll the channel list and select/highlight one channel identifier from the channel list. The program guide can automatically tune into the selected channel when the selected channel identifier remains highlighted over a predetermined time threshold. Further, the program guide can generate a channel preview pane and display the channel preview pane on the screen. The user viewing the channel preview pane may quickly obtain a visual and/or audio preview of the content without fully switching to that channel and without discontinuation of viewing the primary content in the main display area. Thus, the program guide enhances the efficiency of channel surfing and user experiences and facilitate the user to make decisions on channel switch.

According to some embodiments, the program guide may further include a channel group list having multiple channel group identifiers. Each channel group identifier corresponds to a particular channel list (i.e., a group of channels sharing a common characteristic). The channel group list may allow the user to organize the channels into groups based on the user's preferences and favorites or based on the user's viewing habit and history. The user may select a channel group identifier and view a list of channels associated with the channel group identifier alongside the channel group identifier. Thus, the efficiency of channel surfing may be further improved.

Figure 1A:
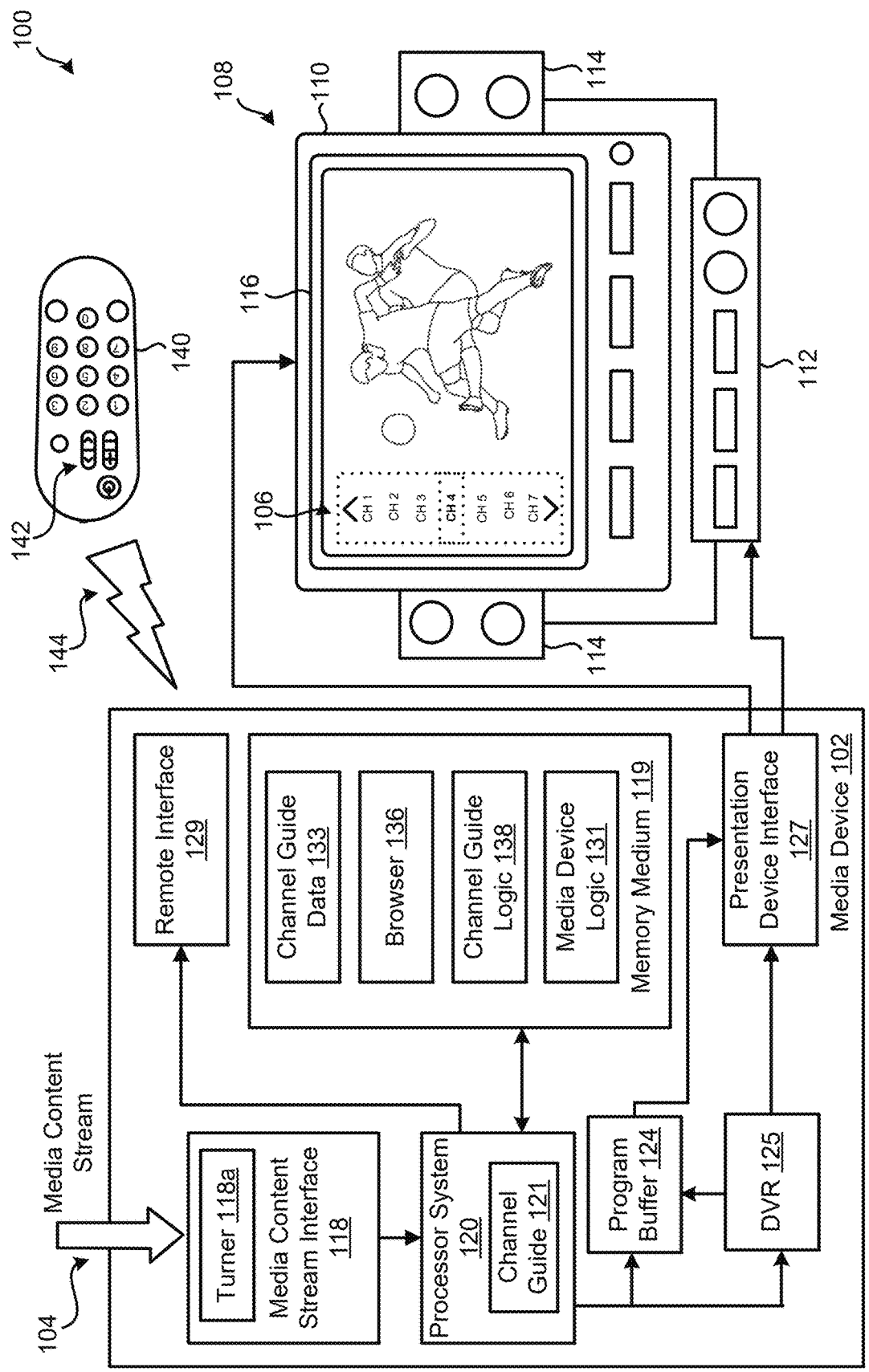
FIG. 1A is a schematic diagram illustrating an example of a media content event information system, according to various embodiments.

FIG. 1A is a schematic diagram illustrating an example of a media content event information system 100 provisioned in a media device 102, according to various embodiments. The exemplary media device 102 receives a plurality of programs in a media content stream 104. The media content event information system 100 is configured to construct and present an on-screen selectable channel guide 106 (hereinafter "channel guide" 106). The media content event information system 100 generates a channel guide 106 that provides more channel information with minimum disruption of viewing experience, and improves the efficiency and accuracy of channel selection by the user.

An exemplary media device 102 includes, but is not limited to, a set top box (STB) that is communicatively coupled to a broadcast system (not shown). Other embodiments of the media device 102 include a television (TV), a digital video disc (DVD) player/recorder, a Blue-ray player/recorder, a game playing device, or a personal computer (PC). The media device 102 is configured to present selected media content events that are received in the media content stream 104.

The media content stream 104 may include one or more streaming media content events (referred to herein interchangeably as a "digital program" or "program") provided from the media content broadcast facility over the broadcast system (not shown) operated by a media content service provider. Non-limiting examples of broadcasting systems include satellite systems, cable or other wire-based systems, over the air (OTA), or over-the-top (OTT) broadcasting systems. Since the media content service provider is providing content from many individual program provider sources (referred to herein interchangeably as a "station"), or even thousands of different stations, some broadcasting systems provide a plurality of different media content streams 104 each providing content from one or more different stations. For illustrative purposes, an example of an OTA device is AirTV by AirTV L.L.C, a wholly owned subsidiary of DISH Network Corporation, Englewood, Colo., and an example of an OTT service is Sling Television (commonly known as SlingTV) by Sling TV L.L.C., Englewood, Colo., a wholly owned subsidiary of Dish Network Corporation.

The exemplary media device 102 is communicatively coupled to a media presentation system (or a media presentation device) 108 that includes a visual display device 110, such as a television (TV), and an audio presentation device 112, such as a surround sound receiver controlling an audio reproduction device (hereafter, generically, a speaker 114). Other types of output devices may also be coupled to the media device 102, including those providing any sort of stimuli sensible by a human being, such as temperature, vibration and the like. The video portion of the media content event is displayed on a display 116 and the audio portion of the media content event is reproduced as sounds by one or more speakers 114. In some embodiments, the media device 102 and one or more of the components of the media presentation system 108 may be integrated into a single electronic device. The video portion of the streamed media content is displayed on the display 116 and the audio portion of the streamed media content is reproduced as sounds by the speakers 114.

The non-limiting exemplary media device 102 includes, among other components, a media content stream interface 118, a processor system 120, a memory medium 119, a program buffer 124, an optional digital video recorder (DVR) 125, a presentation device interface 127, and a remote interface 129. The memory medium 119 includes portions for storing the media device logic 131, the channel guide information/data 134, an optional browser 136, and the channel guide logic 138. In some embodiments, the media device logic 131 and the channel guide logic 138 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, such as a set top box, is now broadly described. A media content service provider provides media content that is received in one or more multiple media content streams 104 multiplexed together in one or more transport channels. The transport channels with the media content streams 104 are communicated to the media device 102 from a media system sourced from a remote head end facility (not shown) operated by the media content service provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 118. In a broadcast environment, one or more tuners 118a in the media content stream interface 118 selectively tune to one of the media content streams 104 in accordance with instructions received from the processor system 120. The processor system 120, executing the media device logic 131 and based upon a request for a particular program of interest specified by a user, parses out media content associated with the specified program. The program is then assembled into a stream of video and/or audio information which may be stored by the program buffer 124 such that the media content of the program can be streamed out to components of the media presentation system 108, such as the visual display device 110 and/or the audio presentation device 112, via the presentation device interface 127. Alternatively, or additionally, the parsed-out media content may be saved into the DVR 125 for later presentation. The DVR 125 may be directly provided in, locally connected to, or remotely connected to, the media device 102. In alternative embodiments, the media content streams 104 may be stored for later decompression, processing and/or decryption.

From time to time, information populating the portion of the memory medium 119 corresponding to the channel guide information 133 is communicated to the media device 102, via the media content stream 104 or via another suitable content distribution system. The channel guide information 133 stores information pertaining to the channel, station, or program/service providers. The information stored in the channel guide information 133 portion of the memory medium 119 may include, but is not limited to, a channel number and/or station call letters, a name, logo, representative symbol of the channel or station, and descriptive information about each program, station, and/or channel. The channel's descriptive information (channel identification information or the like) may include the title of the channel, programs currently being broadcast or scheduled, actors or players related to the programs of the channel, and so on. Any suitable information may be included in the channel's descriptive information, including thumbnail images, short duration thumbnail video clips, and/or a stream of the current program broadcast in a channel, etc. Upon receipt of a command from the user requesting presentation of a channel guide, the information in the channel guide information 133 is retrieved, formatted, and then presented on the display 116 as the channel guide 106.

In some embodiments, the channel guide 106 may include presentation of a thumbnail image, a thumbnail video clip, and/or a stream of the current program broadcast in a channel. A thumbnail image is a small sized still image that imparts information pertaining to a particular program being broadcast or scheduled to be broadcast on a channel of the channel guide. A thumbnail video clip is a short duration video that imparts information pertaining to a particular program of a channel. The thumbnail image and/or thumbnail image clip may be small enough in size to be included in the channel guide 106 that is being presented on the display 116. The thumbnail image, thumbnail video clip, and stream of a current stream broadcast in a selected channel may be presented on the screen in a picture-in-picture (PiP) mode on the display 116.

The exemplary media device 102 is configured to receive commands from a user via a remote control 140. The remote control 140 includes one or more controllers 142 disposed on the surface of the remote control 140. The user, by actuating one or more of the controllers 142, causes the remote control 140 to generate and transmit commands, via a wireless signal 144, to the media device 102. The commands control the media device 102 and/or control the components of the media presentation system 108. The wireless signal 144 may be an infrared (IR) signal or a radio frequency (RF) signal that is detectable by the remote interface 129.

The processes performed by the media device 102 relating to the processing of the received media content stream 104 and communication of a presentable media content event to the components of the media presentation system 108 are generally implemented by the processor system 120 while executing the media device logic 131. Thus, the media device 102 may perform a variety of functions related to the processing and presentation of one or more programs (e.g., media content events) received in the media content stream 104. The processor system 120 includes a channel guide engine 121 configured to execute the channel guide logic 138 and generate data corresponding to the channel guide 106. The data corresponding to the channel guide 106 generated by the channel guide engine 121 is transmitted to the media presentation system 108 through the presentation device interface 127, such that the channel guide 106 can be displayed on the display 116 for the user to view and interact with.

Figure 1B:
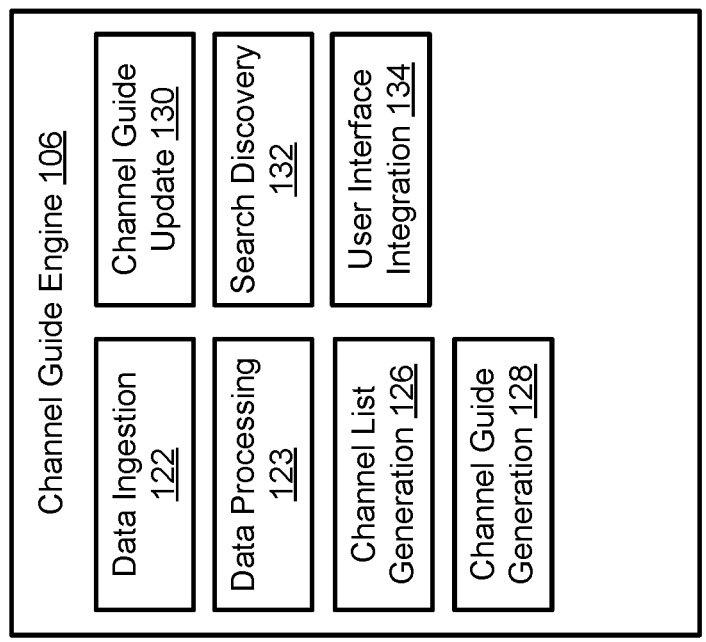
FIG. 1B is a schematic diagram illustrating an example of the channel guide engine, according to various embodiments.

FIG. 1B is a schematic diagram illustrating an example of the channel guide engine 121, according to various embodiments. In the illustrated example, the channel guide engine 121 includes, among other components, a data ingestion component 122, a data processing component 123, a channel list generation component 126, a channel guide generation component 128, a channel guide update component 130, a search discovery component 132, a user interface integration component 134. Various components of the channel guide engine 121 may include a hardware component, a software component, or a combination of both.

The data ingestion component 122 is configured to acquire and collect channel and program information from various sources. The data ingestion component 122 handles the retrieval and ingestion of data and information into the channel guide engine to ensure that the relevant data is obtained and prepared for further processing. The data processing component 123 is configured to perform the necessary operations on the ingested data to transform it into a usable format. The data processing component 123 may perform data parsing, normalization, and filtering to ensures that the data is structured and organized appropriately for subsequent stages of channel guide generation and management.

The channel list generation component 126 is configured to generate the initial list of available channels based on the processed data. The channel list generation component 126 may compile the relevant channel information, such as channel names, logos, numbers, and associated metadata, into a comprehensive list that forms a base for the channel guide 106. The channel guide generation component 128 is configured to utilize the channel list and additional data to create the on-screen selectable channel guide 106. In some embodiments, the channel guide generation component 128 may incorporate user interface elements, program schedules, descriptions, names, logos, and other graphical assets to generate a visually informative display of the available channels to be presented on the user interface of the visual display device 110. In some embodiments, the channel guide generation component 128 may be configured to generate a channel group list. The channel group list may include multiple channel group identifiers, and each group identifier corresponds to a group or list of channels sharing a common characteristic.

The channel guide update component 130 is to monitor changes in the channel lineup, program schedules, and other relevant data sources responsible to keep the channel guide up to date. The channel guide update component 130 can identify and apply the necessary modifications to the channel guide 106 to ensure that the channel guide 106 reflects the latest information for users. The search discovery component 132 is configured to facilitate user search and content discovery within the channel guide 106. The search discovery component 132 may include functionality for keyword-based search, filtering, and sorting of channels and programs in the channel guide 106.

The user interface integration component 134 is configured to generate a channel guide user interface (also referred to and used interchangeably with "channel surfing user interface"). In some embodiments, the user interface integration component 134 may transmit the channel guide user interface to the media presentation system 108 to allow the presentation of the channel guide user interface on the visual display device 110. In alternative embodiments, the user interface integration component 134 can integrate the channel guide 106 seamlessly into an existing user interface of the media streaming application of the media presentation system 108. In some embodiments, the user interface integration component 134 may perform a routine check to verify that the channel guide is properly displayed and overlaid on the presenting screen without interfering with the presentation of the current content.

Figure 2A:
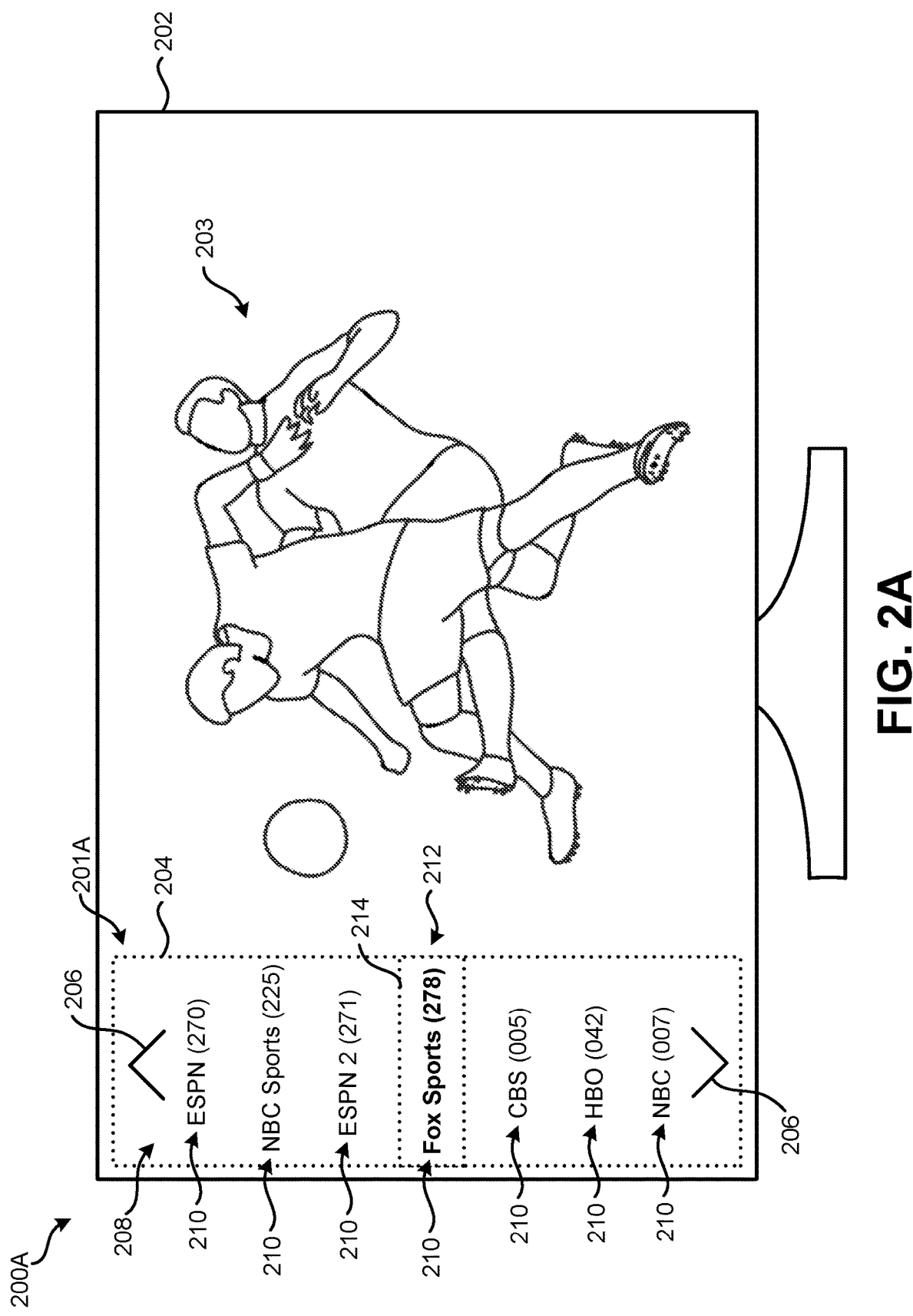
FIGS. 2A, 2B, and 2C are schematic diagrams illustrating screenshots of various example channel guides displayed in a user interface, according to various embodiments.

FIG. 2A is a schematic diagram illustrating a screenshot of an example channel guide 201A displayed on a user interface 200A, according to various embodiments. The user interface 200A includes various visual elements. The channel guide 201A is a representative example of the channel guide 106 of FIG. 1A. As an example for illustrative purposes only, the program guide user interface 200A is displayed on the visual display device 110. Initial presentation of the channel guide 201A may be initiated by the user actuation of one or more of the controllers 142 on their remote control 140 (FIG. 1A). In the illustrated example of FIG. 2A, the program guide user interface 200A includes, among other visual components, a main display area 202 and a channel list display area 204.

The main display area 202 may be extended to the full or nearly full scale of the presenting screen of the visual display device 110. The channel list display area 204 may be overlaid on the main display area 202 and positioned at either side of the main display area (e.g., the right or left side of the main display area 202 shown in FIG. 2A), or alternatively near the top or bottom of the main display area 202. In some embodiments, primary content 203 of a current/ongoing program being broadcast on a channel is presented on the main display area 202. A channel list 208 is displayed in the channel list display area 204. The presentation and display of the channel list do not interrupt (e.g., break off, pause, suspend, or discontinue) the presentation or constant flow of the primary content 203 of the current program in the main display area 202. Thus, the user's viewing of the current program is not interrupted.

In some embodiments, the main display area 202 is reduced in size such that the main display area 202 and the channel list display area 204 do not substantially overlap with each other and are co-presenting on the visual display device 110 without visual interference. For example, the channel list display area 204 occupies about 20% of the total area proximate to the right side of the visual display device 110, while the main display area 202 occupies the remaining area of the visual display device 110 (i.e., about 80% of the total area). The relative sizes of the main display area 202 and the channel list display area 204 may vary depending on design requirements.

The channel list display area 204 may be horizontally arranged or vertically arranged and include multiple channel identifiers 210 arranged in a list. The list of the channel identifiers is scrollable via the actuation of one or more scroll indicators 206 (e.g., buttons, arrows, or other types of actuators). Actuation of the scrolling indicators 206 enables users to navigate through the channel list by scrolling or moving up and down and provides a means for users to browse through a large number of channels that cannot fit entirely on the channel list display area 204 at once. As illustrated, the scroll indicator 206 is represented by an arrow displayed at the top or bottom of the channel list display area 204, indicating the direction of scrolling. Users can interact with the scroll indicators 206 using various input methods such as the remote control 140, or a mouse, a touchscreen gesture, or keyboard navigation. When users activate the scroll indicator 206, the channel list moves or scrolls in the indicated direction, revealing additional channels that were not initially visible on the screen.

The channel identifier 210 may be the name, logo, icon, call letter, acronym, number, symbol, or other graphical means representing and identifying the channel. In some embodiments, a combination of channel numbers, names, call letters, logos, or icons may be utilized together, depending on the preferences and conventions of the broadcasting system or media service provider.

In some embodiments, the main display area 202 is automatically dimmed or darkened during the presentation of the channel list in the channel list display area 204. Dimming may be achieved by adjusting the brightness or opacity of the main display area 202, creating a visual contrast between the channel list and the background content. Users can navigate and select channels within the overlaid channel list while the currently presented content in the main display area 202 remains dimmed. The dimming effect is typically reversed or removed when the user exits the channel list or makes a channel selection, allowing the main display area to return to its normal brightness or opacity.

In some embodiments, the channel guide further includes a focus indicator 212 (also referred to as "selection indicator," "selection highlighter," or the like). The focus indicator 212 may include a focus area 214 (also referred to as "highlight area") within the channel list display area 204. When the user navigates through the channel list in channel list display area 204 using a scrolling mechanism (i.e., the scroll indicator 206) or other input methods, the user may move the focus indicator 212, such that the focus indicator 212 dynamically updates its position to highlight the corresponding channel identifier 210 that is within the focus area 214. The focus indicator 212 may be a visual cue that highlights the currently selected channel identifier 210 within the focus area 214. The focus indicator 212 may take various forms, such as a colored background, a border around the channel entry, an overlay, a bold text, an enlarged text, or any other visual element that conspicuously distinguishes the selected channel in the focus area 214 from the unselected channels in the channel list. In some embodiments, the focus indicator 212 may be movable along the direction of the channel list. As the user moves the focus indicator 212 up or down the channel list, the focus indicator 212 moves accordingly to highlight the currently selected channel. This dynamic highlighting provided by the focus indicator 212 ensures that the user's attention is directed to the channel they are currently considering. Upon receiving a user command scrolling the channel list, a channel identifier 210 can move into the focus area 214 and can be highlighted by the focus indicator 212. Alternatively, the user may activate the focus indicator 212 by moving up and down the focus area 214 to select a channel identifier 210 in the channel list 208. Moving up and down the focus area 214 may cause actuation/activation of the scroll indicator 206 to control the channel list 208 to scroll. Then, the user can perform various actions on the selected channel, such as pressing a button or using a specific input command to tune into the selected channel or access additional information about the channel.

In some embodiments, an "auto-channel switch" or "auto-tune" feature is provided by the channel guide 201A. For example, when a user selects or highlights a channel identifier 210 in the channel list 208 using the focus indicator 212, monitoring the selected channel identifier is triggered. A pre-determined time threshold, which represents the duration that the selected channel identifier must remain highlighted without any user interaction, may be set by the channel guide engine 121. If the selected channel identifier remains highlighted for the specified time threshold without any user intervention, a channel switch is automatically initiated by the media device 102. Once the media device 102 tunes into the selected channel, the content of the selected channel is displayed on the main display area 202, and the channel guide 201B may be closed automatically. On the other hand, if the automatic channel switch occurs but the user interacts with the user interface 200A (e.g., pressing a button on the remote control, navigating through the channel list, etc.) before the time threshold is reached, the automatic switch is canceled or postponed. In other words, the user's actions may take precedence over the automatic channel switch.

Figure 2B:
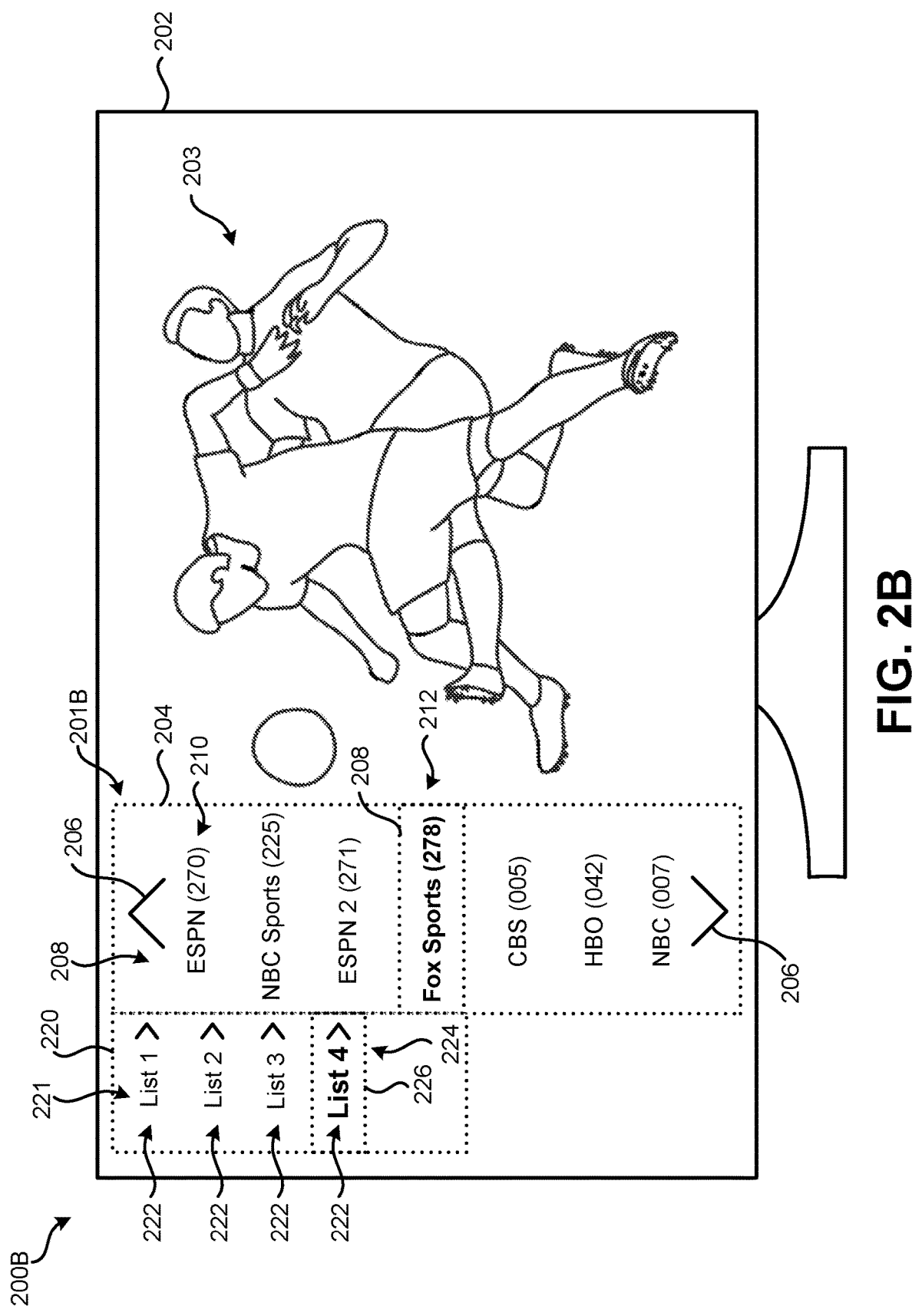

FIG. 2B is a schematic diagram illustrating a screenshot of another example channel guide 201B displayed on a user interface 200A, according to various embodiments. The channel guide 201B is a close variation of the channel guide 201A. In the illustrated example, the user interface 200B includes, among other visual components, a main display area 202, a channel group list display area 220, and a channel list display area 204. The channel guide 201B may include a channel group list 221 that is displayed in the channel group list display area 220.

The channel group list 221 may further include multiple channel group identifiers 222 (also referred to as "channel list identifiers"). Each channel group identifier corresponds to a group of channels (e.g., that share a common characteristic. For example, a channel group identifier 222 may represent a genre (e.g., sports, news, movies), a category (e.g., HD channels, international channels), or a custom user-defined group. In some embodiments, a user may name a channel group and associate her favorite or preferred channels to the channel group. In some embodiments, one or more channel groups may be generated and updated by the channel guide engine 121, based on the user's viewing history, viewing habit, or viewing preference. A channel group identifier 222 may be generated, by the user or by the channel guide engine 121, assigned to each channel group, and included in the channel group list 221.

In some embodiments, the channel guide 201B may also include a focus indicator 224 used to select or highlight a channel group identifier 222 in the channel group list 221. The focus indicator 224 may include a focus area 226 within the channel group list display area 220. Similar to the function of focus indicator 212, users can navigate through the channel group list 221 using scrolling or other input methods. When a user selects or highlights a particular channel group identifier, it triggers an action to display the associated channel list 208. Upon selecting the channel group identifier 222, a channel list 208 associated with the channel group identifier 222 pops up adjacent to the channel group list 221. In other words, the channel list 208 is displayed in the channel list display area 204 that is adjacent to the channel group list display area 220. The channel list 208 displays the channel identifiers 210 that belong to the selected channel group identifier 222. The channel list 208 can be updated dynamically based on the user's selection from the channel group list 221. As the user navigates through the channel group list 221 and selects different group identifiers 222, the corresponding channel list 208 refreshes and displays the channel identifiers 210 associated with the selected channel group identifier 222 in real-time. By the combination of the channel group list 221 and a dynamically updating channel list 208, the channel guide 201B may provide users with a hierarchical organization of channels based on common characteristics. Users can easily navigate through different channel groups and access the corresponding channel lists, allowing for more convenient and efficient channel surfing and selection, based on their preferences or interests.

Figure 2C:
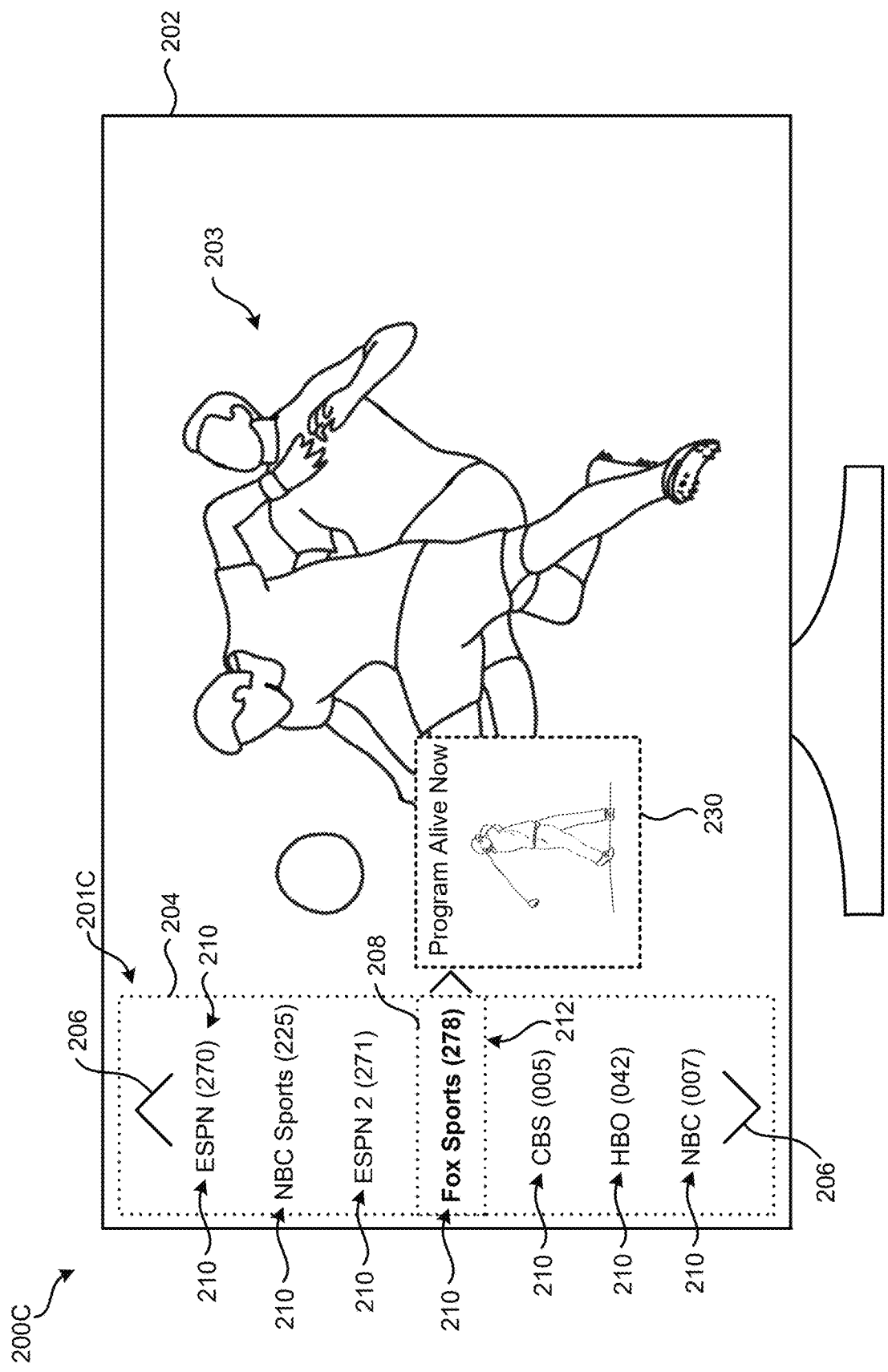

FIG. 2C is a schematic diagram illustrating a screenshot of another example channel guide 201C displayed on a user interface 200A, according to various embodiments. The channel guide 201C is a close variation of the channel guide 201A and 201B. Various features and visual components included in the channel guide 201C may be combined with the channel guide 201A and 201B. In the illustrated example, the user interface 200C includes, among other visual components, a main display area 202, a channel list display area 204, and a channel preview pane 230. The channel guide 201C may include a channel list 208 displayed in the channel list display area 204 and channel preview content displayed in the channel preview pane 230.

In some embodiments, when a user selects or highlights a channel identifier 210 from the channel list 208 using the focus indicator 212, the display of the channel preview pane 230 is triggered. In some embodiments, the channel preview pane 230 is displayed as an overlaid window on the main display area 202 adjacent to the channel list 208. In some embodiments, the channel preview pane 230 may be positioned in a corner or any other suitable area of the main display area 202 without substantially interrupting or obstructing the primary content displayed in the main display area 202 and the channel guide 201C. The relative dimension of the channel preview pane 230 may be pre-determined or adjustable by the user in user settings.

In some embodiments, the channel preview pane 230 may display a live stream or a real-time preview of the currently broadcasting program on the channel corresponding to the selected channel identifier 210. The users viewing the channel preview pane 230 may quickly obtain a visual and audio preview of the content without fully switching to that channel and without discontinuation of viewing the primary content 203 in the main display area 202.

In some embodiments, channel preview pane 230 can also display other information related to the selected channel or program. For example, the program title, status, duration, a brief description, the program schedule, or any other metadata associated with the channel or program may be displayed in the channel preview pane 230. In some embodiments, the user interface 200C may provide other functions to allow the user to interact with the channel preview pane 230, such as resizing or repositioning, adjusting the audio volume of the preview content, or expanding it to full-screen mode for a more immersive preview experience.

Figure 3:
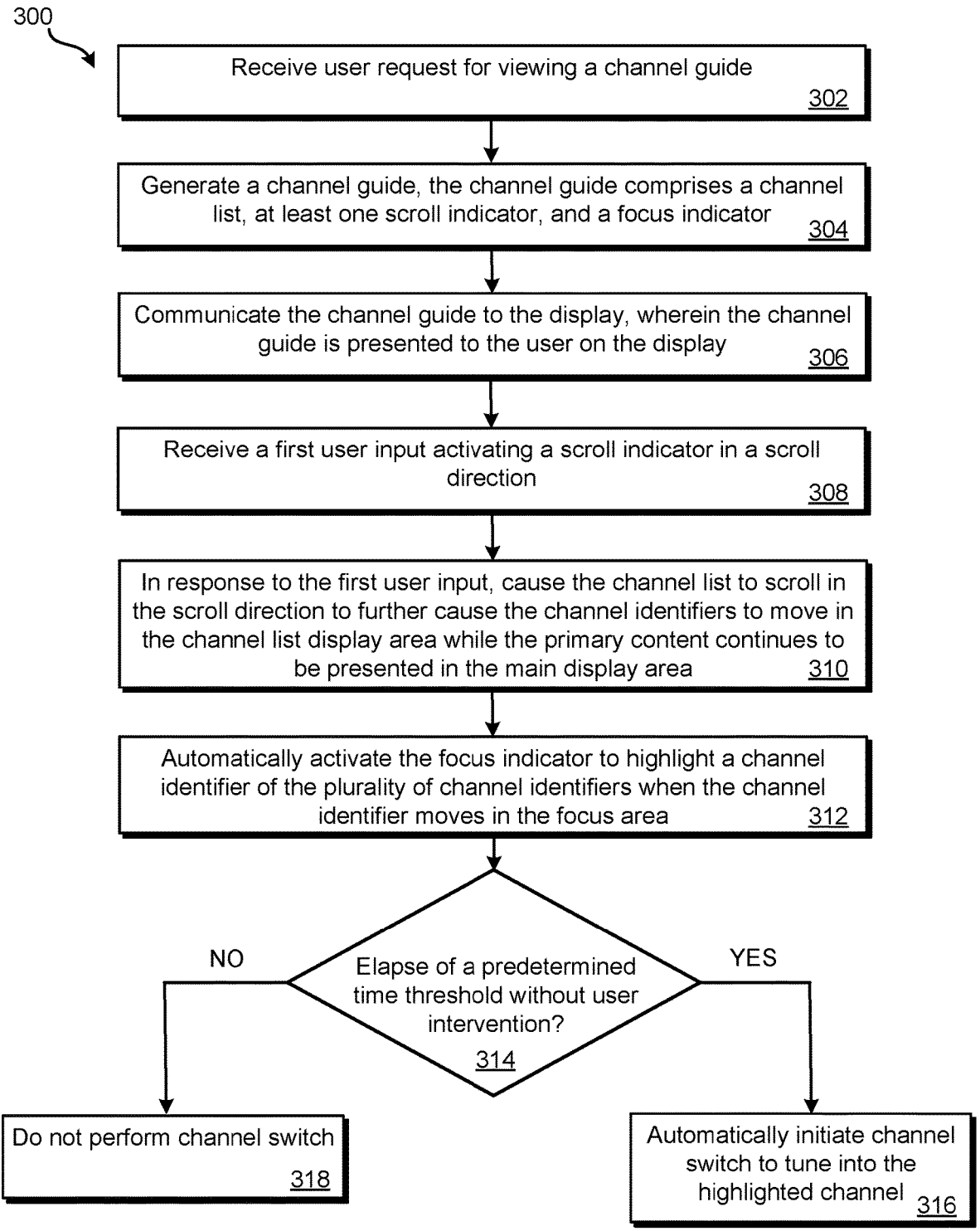
FIG. 3 is a flow diagram illustrating an example method for channel surfing, according to various embodiments.

FIG. 3 is a flow diagram illustrating an example method 300 for channel surfing according to various embodiments.

The method 300 may be performed by one or more components of the system, device, or user interface illustrated in FIGS. 1A-1B and 2A-2C. Depending on the implementation, the method 300 may include additional, fewer, or alternative steps performed in various orders or in parallel.

At 302, a user request is received at the media device (e.g., the media device 102). The user request indicates the user's intention to view the presentation of a channel guide on a display (e.g., the visual display device 110). At 304, in response to the user request, a channel guide is generated, for example, by the media device (e.g., the channel guide engine 121). The channel guide includes, among other components, a channel list, at least one scroll indicator, and a focus indicator, as well as data and information related to and included in each of these components. At 306, the channel guide is communicated to the media streaming system, and the channel guide is caused to be presented to the user on the display. The display further includes a main display area, a channel list display area positioned at one side of the display and overlaid on the main display area, and a focus area within the channel list display area. The primary content of a current channel is presenting in the main display, the channel list is displayed in the channel list display area, and the focus area is arranged to accommodate a channel identifier of the channel list.

At 308, a first user input is received. The first user input may be generated by operating the remote control (e.g., pressing a button or performing a touch gesture, etc.) to request activating the scroll indicator in a scroll direction. At 310, in response to the first user input, the channel list is caused to scroll in the scroll direction to further cause the channel identifiers to move in the channel list display area while the primary content continues to be presented in the main display area. At 312, the focus indicator is automatically activated to highlight a channel identifier of the plurality of channel identifiers when the channel identifier moves in the focus area.

At 314, a determination is made by the media device on whether a predetermined time threshold elapses while the highlighted channel identifier remains highlighted in the focus area without user intervention. If the predetermined time threshold elapses, the methods proceed to 316. At 316, a channel switch is automatically initiated to tune into the channel corresponding to the highlighted channel identifier. The content of the channel is presented in the main display area. On the other hand, if the channel fails to remain in the focus area before the elapse of the predetermined time threshold, an automatic channel switch is not performed, and the presentation of the primary content of the current channel remains in the main display area.

Figure 4:
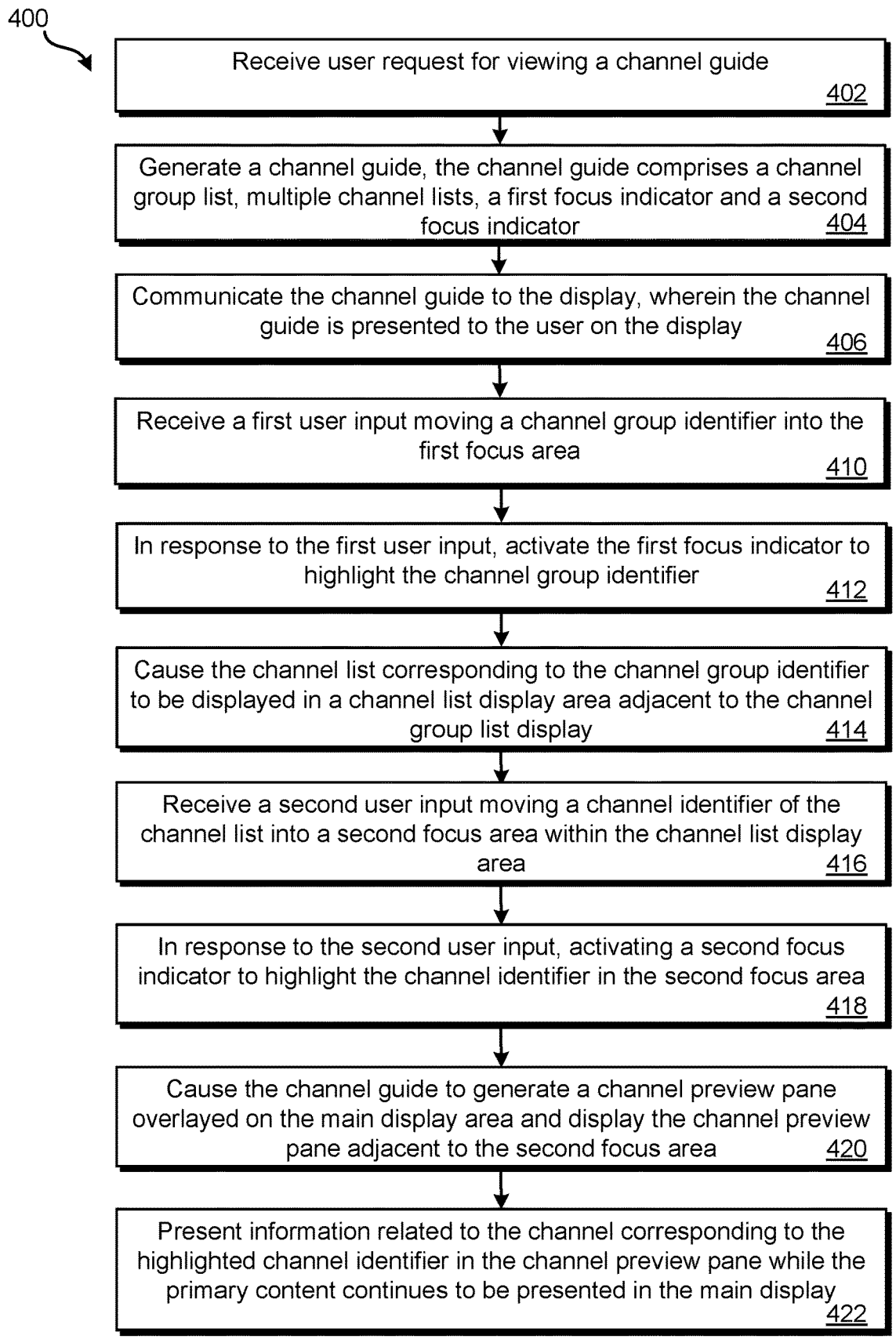
FIG. 4 is a flow diagram illustrating another example method for channel surfing, according to various embodiments.

FIG. 4 is a flow diagram illustrating another example method 400 for channel surfing according to various embodiments. The method 400 is similar to the method 300, and operations of the methods 300 and 400 may be combined and arranged in an appropriate sequence. Depending on the implementation, the method 400 may include additional, fewer, or alternative steps performed in various orders or in parallel.

At 402, a user request is received at the media device. At 404, in response to the user request, a channel guide is generated. The channel guide includes, among other components, a channel group list comprising a plurality of channel group identifiers, a plurality of channel lists, each channel list corresponding to one of the channel group identifiers and comprising a plurality of channel identifiers associated with the corresponding channel group identifier, and a first focus indicator, as well as data and information related to and included in each of these components. At 406, the channel guide is communicated to the media streaming system, and the channel guide is caused to be presented to the user on the display. The display further includes a main display area, a channel group list display area positioned at one side of the display and overlaid on the main display area, and a first focus area within the channel group list display area. The primary content of a current channel is presented in the main display, the channel group list is displayed in the channel group list display area, and the first focus area is arranged to accommodate a channel identifier of the channel list.

At 410, a first user input is received. The first user input requests for moving a channel group identifier of the plurality of channel group identifiers into the first focus area. At 412, in response to the first user input, the first focus indicator is activated to highlight the channel group identifier. At 414, the channel list corresponding to the channel group identifier is caused to be displayed in a channel list display area adjacent to the channel group list display and overlaid on the main display area.

At 416, a second user input is received. The second user input requests for moving a channel identifier of the channel list into a second focus area within the channel list display area. At 418, in response to the second user input, a second focus indicator is activated to highlight the channel identifier in the second focus area.

At 420, in response to the second user input, the channel guide is caused to automatically generate a channel preview pane overlayed on the main display area and display the channel preview pane adjacent to the second focus area. At 422, information related to the channel corresponding to the highlighted channel identifier is presented in the channel preview pane while the primary content continues to be presented in the main display.

Figure 5:
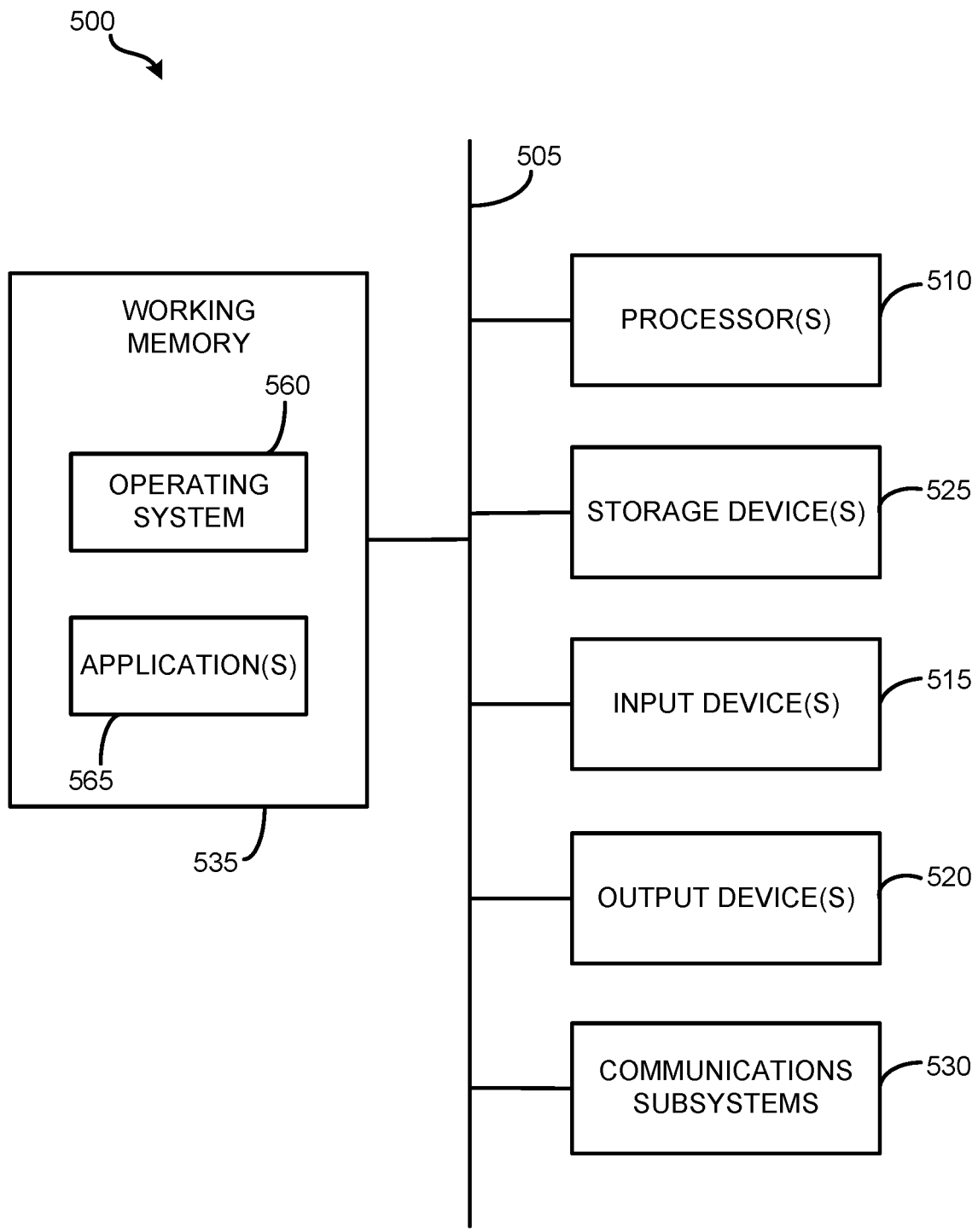
FIG. 5 is a schematic diagram illustrating an embodiment of a computer system according to various embodiments.

FIG. 5 is a schematic diagram illustrating an example of computer system 500. The computer system 500 is a simplified computer system that can be used to implement various embodiments described and illustrated herein. A computer system 500 as illustrated in FIG. 5 may be incorporated into devices such as a portable electronic device, mobile phone, server grade machines, or other device as described herein. FIG. 5 provides a schematic illustration of one embodiment of a computer system 500 that can perform some or all of the steps of the methods and workflows provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, and/or the like; and one or more output devices 520, which can include without limitation a display device, a printer, and/or the like.

The computer system 500 may further include and/or be in communication with one or more non-transitory storage devices 525, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, e.g., the first electronic device, may be incorporated into the computer system 500, e.g., an electronic device as an input device 515. In some embodiments, the computer system 500 will further include a working memory 535, which can include a RAM or ROM device, as described above.

The computer system 500 also can include software elements, shown as being currently located within the working memory 535, including an operating system 560, device drivers, executable libraries, and/or other code, such as one or more application programs 565, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the operations of such methods are performed by the computer system 500 in response to processor 510 executing one or more sequences of one or more instructions, which might be incorporated into the operating system 560 and/or other code, such as an application program 565, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

While the present disclosure is made with respect to example SLINGTV® broadcast services and systems, it should be understood that many other content delivery and recording systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multichannel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", an and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:
    receiving, at a media device, a user request from a user to view presentation of a channel guide on a display;
    in response to the user request, generating a channel guide, wherein the channel guide comprises a channel list comprising a plurality of channel identifiers, at least one scroll indicator, and a focus indicator;
    communicating the channel guide to the display, wherein the channel guide is presented to the user on the display, and wherein the display comprises:
    a main display area, wherein primary content of a current channel is being presented in the main display;
    a channel list display area positioned at one side of the display and overlaid on the main display area, wherein the channel list is displayed in the channel list display area; and
    a focus area within the channel list display area, the focus area arranged to accommodate a channel identifier of the channel list;
    receiving a first user input activating the scroll indicator in a scroll direction; and
    in response to the first user input:
    causing the channel list to scroll in the scroll direction to further cause the channel identifiers to move in the channel list display area while the primary content continues to be presented in the main display area;
    automatically activating the focus indicator to highlight a channel identifier of the plurality of channel identifiers when the channel identifier moves in the focus area;
    causing the channel guide to generate a channel preview pane;
    displaying the channel preview pane adjacent to the focus area, wherein the channel preview pane overlays on the main display area in a user-selectable position and configured to be expandable to a full-screen mode; and
    presenting a live stream of content of a currently broadcasting program related to the channel corresponding to the highlighted channel identifier in the channel preview pane while the primary content continues to be presented in the main display.

2. The method of claim 1, further comprising:
    automatically and immediately initiating a channel switch to tune into the channel corresponding to the highlighted channel identifier, after passage of a predetermined time threshold during which the highlighted channel identifier remains highlighted in the focus area without user intervention.

3. The method of claim 1, further comprising:
receiving a second user input for channel change; and
in response to the second user input, tuning into the channel corresponding to the highlighted channel identifier; and
presenting content of the channel corresponding to the highlighted channel identifier in the main display area.

4. The method of claim 1, wherein the channel preview pane has a dimension adjustable by the user.

5. The method of claim 1, wherein the display is integrated into a media presentation device.

6. A method, comprising:
receiving, at a media device, a user request from a user to view presentation of a channel guide on a display;
in response to the user request, generating a channel guide, wherein the channel guide comprises:
a channel group list comprising a plurality of channel group identifiers;
a plurality of channel lists, each channel list corresponding to one of the channel group identifiers and comprising a plurality of channel identifiers associated with the corresponding channel group identifier;
a first focus indicator;
communicating the channel guide to the display, wherein the channel guide is presented to the user on the display, and wherein the display comprises:
a main display area, wherein primary content of a current channel is presented in the main display;
a channel group list display area positioned at one side of the display and overlaid on the main display area, wherein the channel group list is displayed in the channel list display area;
a first focus area within the channel group list display area, the first focus area arranged to accommodate a channel group identifier of the channel group list;
receiving a first user input for moving a channel group identifier of the plurality of channel group identifiers into the first focus area;
in response to the first user input, activating the first focus indicator to highlight the channel group identifier;
causing the channel list corresponding to the channel group identifier to be displayed in a channel group list display area adjacent to the channel group list display and overlaid on the main display area;
automatically activating the focus indicator to highlight a channel identifier of the plurality of channel identifiers when the channel identifier moves in the focus area;
causing the channel guide to generate a channel preview pane;
displaying the channel preview pane adjacent to the focus area, wherein the channel preview pane overlays on the main display area in a user selectable position and configured to be expandable to a full-screen mode; and
presenting a live stream of content of a currently broadcasting program related to the channel corresponding to the highlighted channel identifier in the channel preview pane while the primary content continues to be presented in the main display.

7. The method of claim 6, further comprising:
receiving a second user input moving a channel identifier of the channel list into a second focus area within the channel list display area; and
in response to the second user input, activating a second focus indicator to highlight the channel identifier in the second focus area.

8. The method of claim 6, wherein the channel preview pane has a dimension adjustable by the user.

9. A system for channel surfing, the system comprising:
a tuner;
one or more processors; and
a computer-readable storage media storing computer-executable instructions that, when executed by the one or more processors, cause the system to:
receive, at a media device, a user request from a user to view presentation of a channel guide on a display;
in response to the user request, generate a channel guide, wherein the channel guide comprises a channel list comprising a plurality of channel identifiers, at least one scroll indicator, and a focus indicator;
communicate the channel guide to the display, wherein the channel guide is presented to the user on the display, and wherein the display comprises:
a main display area, wherein primary content of a current channel is being presented in the main display;
a channel list display area positioned at one side of the display and overlaid on the main display area, wherein the channel list is displayed in the channel list display area; and
a focus area within the channel list display area, the focus area arranged to accommodate a channel identifier of the channel list;
receive a first user input activating the scroll indicator in a scroll direction; and
in response to the first user input:
cause the channel list to scroll in the scroll direction to further cause the channel identifiers to move in the channel list display area while the primary content continues to be presented in the main display area
automatically activate the focus indicator to highlight a channel identifier of the plurality of channel identifiers when the channel identifier moves in the focus area;
cause the channel guide to generate a channel preview pane;
display the channel preview pane adjacent to the focus area, wherein the channel preview pane overlays on the main display area in a user-selectable position and configured to be expandable to a full-screen mode; and
present a live stream of content of a currently broadcasting program related to the channel corresponding to the highlighted channel identifier in the channel preview pane while the primary content continues to be presented in the main display.

10. The system of claim 9, wherein, the instructions when executed by the one or more processors further cause the system to:
automatically and immediately activate the tuner to initiate a channel switch to tune into the channel corresponding to the highlighted channel identifier, after passage of a predetermined time threshold during which the highlighted channel identifier remains highlighted in the focus area without user intervention.

11. The system of claim 9, wherein, the instructions when executed by the one or more processors further cause the system to:
receive a second user input for channel change; and
in response to the second user input, activate the tuner to tune into the channel corresponding to the highlighted channel identifier; and
present content of the channel corresponding to the highlighted channel identifier in the main display area.

12. The system of claim 9, wherein the display is integrated into a media presentation device.

* * * * *